US007749413B1

(12) United States Patent
Hurst et al.

(10) Patent No.: US 7,749,413 B1
(45) Date of Patent: Jul. 6, 2010

(54) METHOD FOR REFURBISHING CYCLINDRICAL MEMBERS

(75) Inventors: James H. Hurst, Rochester, NY (US); Jiann-Hsing Chen, Fairport, NY (US); Donald S. Rimai, Webster, NY (US); W. Charles Kasiske, Jr., Penfield, NY (US); Donna P. Suchy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/335,791

(22) Filed: Dec. 16, 2008

(51) Int. Cl.
*B29C 73/00* (2006.01)

(52) U.S. Cl. .................................... 264/36.12; 425/150

(58) Field of Classification Search .............. 264/36.12; 427/140
See application file for complete search history.

(56) References Cited

U.S. PATENT DOCUMENTS

| | | | | |
|---|---|---|---|---|
| 4,224,601 | A * | 9/1980 | Davidson | 347/161 |
| 5,485,792 | A * | 1/1996 | Keyser et al. | 106/31.19 |
| 2007/0296122 | A1 | 12/2007 | Chen et al. | |
| 2007/0298217 | A1 | 12/2007 | Chen et al. | |
| 2007/0298251 | A1 | 12/2007 | Chen et al. | |
| 2007/0298252 | A1 | 12/2007 | Chen et al. | |
| 2008/0279582 | A1 | 11/2008 | Jao et al. | |
| 2008/0280035 | A1 | 11/2008 | Jao et al. | |

OTHER PUBLICATIONS

Pocius, Alphonsus V. "Adhesion" in Kirk-Othmer Encyclopedia of Chemical Technology, posted Mar. 15, 2002, pp. 505-507.*
U.S. Appl. No. 12/277,392, filed Nov. 25, 2008, Hurst et al., entitled: "Method for Refurbishing Pressure Members."

* cited by examiner

*Primary Examiner*—Christina Johnson
*Assistant Examiner*—Magali P Théodore
(74) *Attorney, Agent, or Firm*—Donna P. Suchy

(57) ABSTRACT

The present invention provides a method of resurfacing a cylindrical member in a printer having a fuser member that is externally heated by a heater roller. The method includes providing a cylindrical member having an outer surface of a high temperature fluorothermoplastic. When it is determined that the outer surface is in need of resurfacing, the fuser member is removed from the printer, and the cylindrical member is mounted in the place of the fuser member. The cylindrical member is rotated at a speed of at least 1 rpm while engaging the outer surface of the fuser member with the heating roller normally used to heat the fuser member at a pressure of at least 5 psi at a temperature of at least 10° C. below the fluorothermoplastic melting temperature for a time sufficient to resurface of the outer surface of the cylindrical member.

22 Claims, 5 Drawing Sheets

METHOD FOR REFURBISHING CYCLINDRICAL MEMBERS

CROSS-REFERENCE TO RELATED APPLICATIONS

This application relates to commonly assigned, copending U.S. application Ser. No. 11/746,083, filed May 9, 2007, entitled: "IN-LINE METHOD TO REFURBISH FUSER MEMBERS", U.S. application Ser. Nos. 11/472,771, 11/472,888, 11/472,918 each of which were filed on Jun. 22, 2006, and each entitled: FUSER MEMBER, U.S. application Ser. No. 11/472,919, filed Jun. 22, 2006, entitled: METHOD OF MAKING FUSER MEMBER, U.S. Ser. No. 11/746,089, filed May 9, 2007, entitled: ELECTROPHOTOGRAPHIC APPARATUS, and U.S. application Ser. No. 12/277,392 filed Nov. 25, 2008, entitled: METHOD FOR REFURBISHING PRESSURE MEMBERS.

FIELD OF THE INVENTION

This invention generally relates to electrostatographic devices and methods for refurbishing cylindrical members such as fuser and pressure members, and is particularly concerned with the refurbishment of a pressure roller or member which is coated with an outermost layer of fluoropolymer resin.

BACKGROUND OF THE INVENTION

The surface (or the topcoat) for both fuser and pressure members in oil-less fusing of toner material requires ultra low surface energy to release the substrate. An improved topcoat material for oil-less fusing is high-temperature tolerant thermoplastic, such as FEP, PFA, or PTFE described in US Published Applications 2007/0298252, 2007/0298251, 2007/0298217, and 2007/0296122 each of which were published on Dec. 27, 2007.

However, the applicants have observed during fuser printing performance tests that paper edges, particularly of thick paper, can occasionally leave wear marks on the topcoat of the fuser surface. These paper edge marks can show up on wider paper as gloss-variation artifacts when subsequent prints are made on a substrate covering the worn area. Moreover, for printing special images, particularly one with in-track stripes of area of no toners, foreign materials from paper are seen to periodically accumulate on the surface of the topcoat due to the absence of toners. Such foreign materials may be, for example, the fine particulate clay or calcium carbonate fillers often present on the surface of the paper being printed. The accumulation of such foreign particulate material on the surface of the topcoat can result in undesirable artifacts, such as a gloss variation band artifact occurring when printing a different image content subsequently as a full page image.

In the past, to avoid such artifacts, the fuser members were simply replaced. To obviate the need and expense associated with completely replacing the fuser members, the applicants developed an in-line method for refurbishing fuser members in-situ which is described and claimed in commonly assigned, copending U.S. application Ser. No. 11/746,083.

The applicants have subsequently observed that paper edges, particularly of thick paper, can also leave wear marks on the topcoat of the pressure member surface, and that foreign materials from paper can also periodically accumulate on the surface of the pressure member topcoat. Consequently, undesirable image artifacts may be caused by the pressure members as well as the fuser members in electrophotographic printers. The present invention is a method for refurbishing cylindrical members within an electrophotographic printer that obviates the need and expense associated with completely replacing the members The practice of the proposed refurbishing scheme and the accessory surface cleaning scheme depends on the severity of the artifact present on the member surface, which in turn is a function of the service history of the member.

SUMMARY OF THE INVENTION

The present invention provides a method of resurfacing a cylindrical member having an outer surface formed from a high temperature, low surface energy, semicrystalline thermoplastic such as a fluorothermoplastic. When it is determined that the outer surface is in need of resurfacing, the cylindrical member is rotated at a speed of at least 1 rpm while engaging the outer surface of the fuser member with at least one heating roller at a pressure of at least 5 psi at a temperature of between 10° C. below the thermoplastic melting temperature and the melting temperature of the thermoplastic for a time sufficient to resurface of the outer surface of the cylindrical member.

When the cylindrical member is in operation in an electrophotographic printer having a fuser member that is externally heated by a heater roller assembly, the method may further include the steps of replacing the fuser member with another cylindrical member, rotating the cylindrical member at the aforementioned speed via the fuser member drive, and implementing the aforementioned temperature and pressure on the outer surface of the pressure member via the heater roller assembly of the printer. To expedite the these steps of the method, both the fuser member and the pressure member may be mounted within the electrophotographic printer by a quick-release assembly that allows the operator to quickly and easily remove the fuser and pressure members from their normal, operational positions on the frame of the printer and to install the pressure member in the operational position of the fuser member.

For a better understanding of the present invention together with other advantages and capabilities thereof, reference is made to the following description and appended claims in connection with the preceding drawings.

DETAILED DESCRIPTION OF THE INVENTION

The present invention can be applied to refurbishing cylindrical members such as pressure members with low surface energy, semicrystalline thermoplastic topcoat materials, such as FEP (polyfluorinated ethylene-propylene), PFA (perfluoroalkoxy-tetrafluoroethylene), or PTFE (polytetrafluoroethylene). Low surface energy refers to materials having a surface energy of less than 30 ergs/cm$^2$, preferably less than 25 ergs/cm$^2$, and more preferably less than 20 ergs/cm$^2$, as determined from the contact angle with a nonpolar and a polar liquid such as distilled water and diiodomethane and using the Good-Girafalco approximation to approximate the interfacial energy. The instant invention is not dependent on how the pressure member is manufactured, i.e., not affected by whether the topcoat is sleeve molded, sintered with dispersion, sprayed or transfer-coated, etc. The method of the present invention will increase the usable life of the pressure member owing to its ability to remove surface irregularities and restore a uniform gloss surface finish to the pressure member.

For the purpose of this disclosure, the term melt temperature or $T_m$ refers to the temperature at which the onset of melting occurs. This can be determined via various means known in the literature such as observing the onset of a latent heat using differential scanning calorimetry (DSC) or similar devices.

In all embodiments, the pressure members are preferably cylindrically symmetrical, i.e., a cross-section of the roller taken at a right angle to the roller axis anywhere along the length of the member or roller has radial symmetry around the roller axis. The length of the roller thereof determines the range of the printing width of the substrate.

Figure 1:
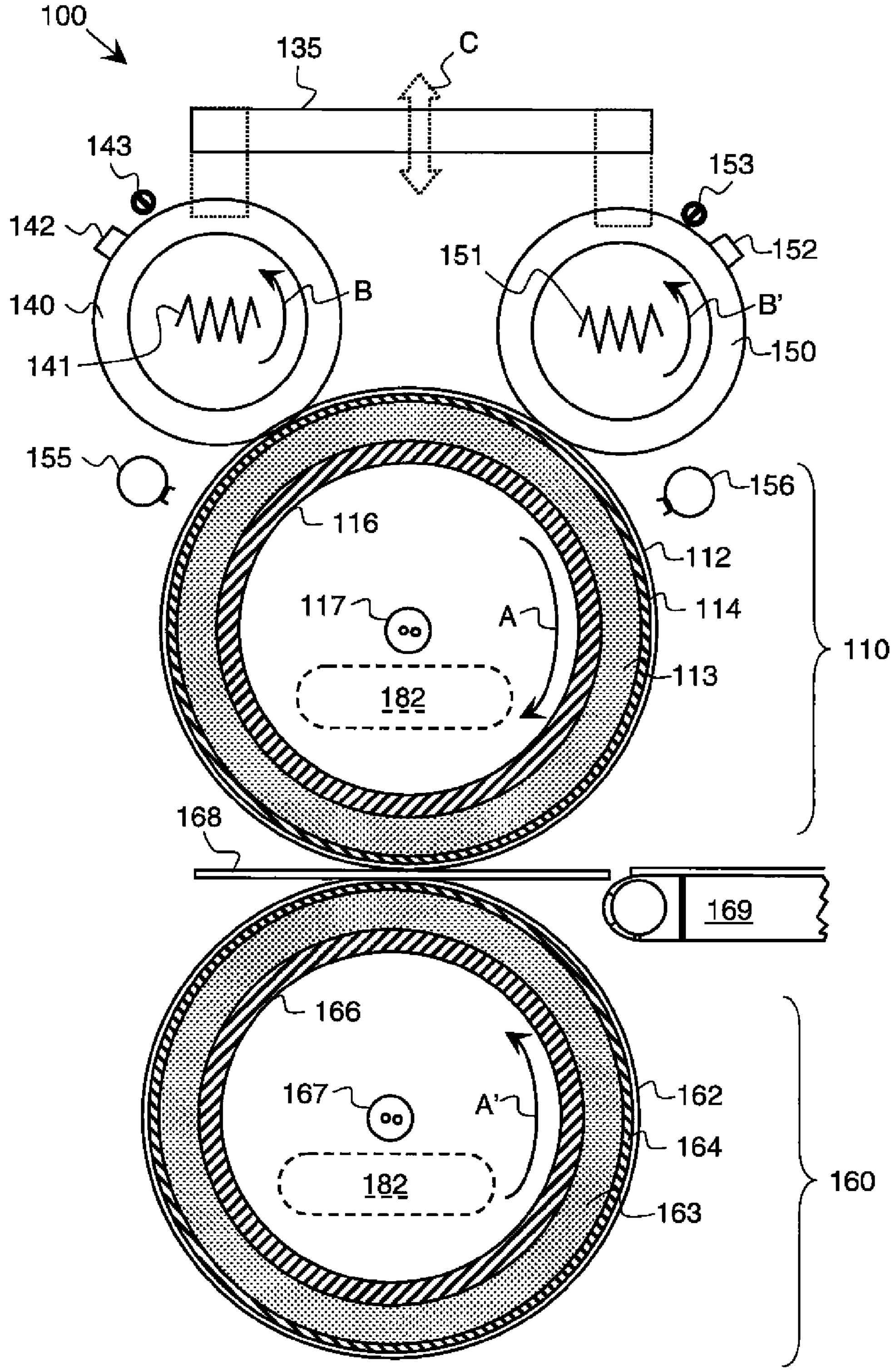
FIG. 1 is a side, cross-sectional schematic view of an electrophotographic printer where the method of the invention may be easily implemented, including a fuser member, a heater roller assembly for externally heating the fuser member, a pressure member having substantially the same diameter as the fuser member, and quick-release assemblies for removing and mounting the fuser and pressure members with respect to the printer frame.
Figure 2:
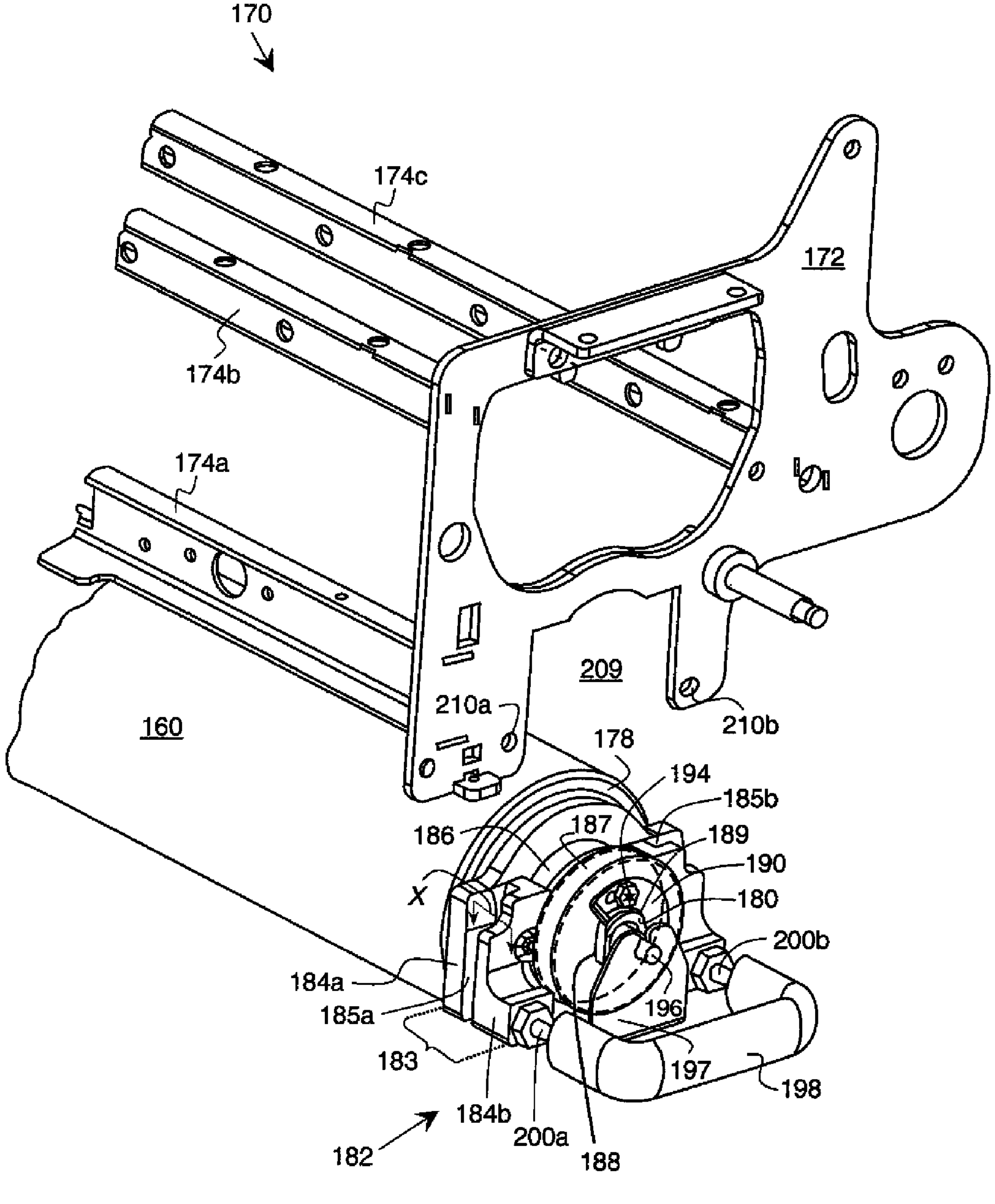
FIG. 2 is an exploded, perspective view illustrating how a fuser or pressure roller is detachably connected to the fuser roller mounting frame via a quick-release assembly.

FIG. 1 schematically illustrates an electrophotographic printer 100 where the method of the invention may be easily implemented, including a fuser member 110, a heater roller assembly 135 for externally heating the fuser member 110, air jets 155, 156 for simulating a thermal load on the fuser member during the warm-up up the printer 100, a pressure member 160 having substantially the same diameter as the fuser member 110, and quick-release assemblies 182 for removing and mounting the fuser and pressure members 110, 160 with respect to a printer frame 170 (shown in FIG. 2). During normal operation, of the printer 100, paper sheets 168 having an image formed by a pattern of dry, particulate toner are conveyed via a conveyor 169 into the nip defined between the fuser member 110 and the pressure member 160. The heat and pressure applied to the paper sheets fuses the toner into a permanent image into the paper.

The fuser member 110 includes a plurality of annular layers 112, 113, and 114 that surround a generally concentric central core 116. Core 116 is usually formed from a metal, such as stainless steel, steel, aluminum, etc. The primary requisite for the material for core 116 is that it be sufficiently stiff to support the force placed upon it during a printing operation, and able to withstand a possibly higher temperature than the surface of the member 110 where there is an optional internal heating source, such as the quartz-halogen light 117 illustrated in cross-section at the center of rotation of the member 110. For externally heated fuser members, the internal heat source 117 can be optional, though in most practical cases, the internal heat supply is used in combination with the external heat provided by the heater roller assembly 135 to fuse the toners for print quality manipulation. The various annular layers that overlie the core 116 include a resilient layer, also termed a cushion layer 113, and tie layers, adhesion promotion layers, and primer layers 114 for bonding the cushion layer with the outmost layer 112. The outermost layer 112 in one embodiment is a toner release layer which includes a thermoplastic fluoropolymer such as PTFE, PFA, and FEP, etc., which are preferred embodiments of low surface energy, semicrystalline thermoplastics suitable for use in this invention, and blends thereof. The fuser member 110 is detachably mounted to a frame 170 in the printer 100 by way of a quick release mechanism 182 (indicated in phantom).

The pressure member 160 preferably has the same structure and diameter as the previously described fuser member 110, including a plurality of annular layers 162, 163, and 164 that surround a generally concentric central core 166 formed from a metal, such as stainless steel, steel, aluminum, etc. Like the fuser member 110, the pressure member 160 includes an internal heat source in the form of a quartz-halogen light 167 illustrated in cross-section at the center of rotation of the member 160. The various annular layers that overlie the core 166 include a resilient layer, also termed a cushion layer 163, and tie layers, adhesion promotion layers, and primer layers 164 for bonding the cushion layer 163 with the outmost layer 162. Like the fuser member 110, the outermost layer 162 of the pressure member 160 is a toner release layer which includes a thermoplastic fluoropolymer such as PTFE, PFA, and FEP, etc. and blends thereof. The pressure member 160 is likewise detachably mounted to a frame 170 in the printer 100 by way of a quick release mechanism 182 (indicated in phantom).

The heater rollers 140, 150 of the heater roller assembly 135 are made of rigid materials, such as chrome-plated steel. FIG. 1 also schematically shows the temperature sensors 142, 152, the over-temp devices 143, 153, the heating elements 141, 151 of the heater rollers 140, 150 and a program-controllable loading assembly C for engaging the heater rollers 140, 150 against the surface of the fuser member 110 at a desired pressure both during normal printing service for externally heating the fuser member 110 to fuse printer toner, and during the pressure member 160 during the implementation of the method of the invention. The loading assembly C may include any one of pneumatic cylinders, a motor-cam combination, a lead screw mechanism or solenoids to control engagement pressure. For this invention, the proximity of the over-temp devices 143, 153 to the topcoat 112 is adjustable and the temperature sensors 142, 152 are calibrated for temperature range up to around the melting point of the topcoat 162 allowing much higher temperature set points needed for pressure member surface refurbishing than those used in the normal printing. When the pressure member refurbishing program is activated, the proximity of the over-temp sensor is adjusted to be farther away from the topcoat surface 162 to a pre-determined distance in the range of 0.5 mm to 3 mm such that it can serve its function as the fusible safety device for higher than the normal printing temperature set points. The heater roller engagement pressure, and temperature and rotational speed of the pressure member 160 then follow a programmed function which is known to best produce a refurbished pressure member surface.

Both the fuser member 110 and pressure member 160 can be a fuser or pressure plate, fuser or pressure roller, fuser or pressure belt or any other member on which a release coating is desirable. The support for the fuser or pressure member can be a metal element with or without additional layers adhered to the metal element. The metal element can take the shape of a cylindrical core, plate or belt. The metal element can be made of, for example, aluminum, stainless steel or nickel. The surface of the metal element can be rough, but it is not necessary for the surface of the metal element to be rough to achieve good adhesion between the metal element and the layer attached to the metal element. The additional support layers adhered to the metal element consist of layers of materials useful for fuser and pressure members, such as silicone rubbers, and an adhesion promoter layer to the metal element.

The fluoropolymer resin outer layer in one embodiment includes a fluoropolymer material, such as a semicrystalline fluoropolymer or a semicrystalline fluoropolymer composite. Such materials include polytetrafluoroethylene (PTFE), polyperfluoroalkoxy-tetrafluoroethylene (PFA), polyfluorinated ethylene-propylene (FEP), poly(ethylenetetrafluoroethylene), polyvinylfluoride, polyvinylidene fluoride (PVFE), poly(ethylene-chloro-trifluoroethylene) (PCTFE), polychlorotrifluoroethylene and mixtures of fluoropolymer resins. Some of these fluoropolymer resins are commercially available from DuPont as Teflon™ or Silverstone™ materials.

Figure 3:
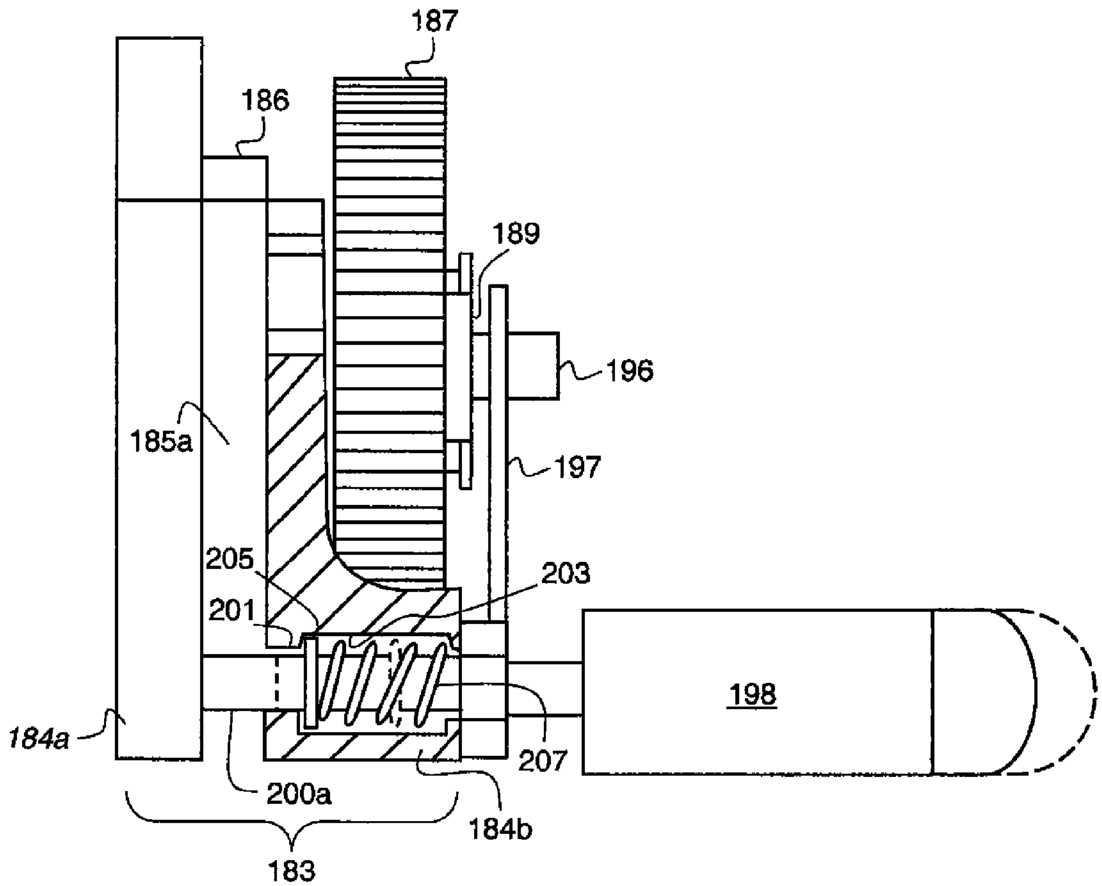
FIG. 3 is a side, partial cross-sectional view of the quick-release assembly shown in FIG. 2, illustrating in phantom how the spring-loaded locking pins are manually extended and retracted to lock and unlock a fuser or pressure roller to the mounting frame.

With reference now to FIGS. 2 and 3, both the fuser and the pressure member 110, 160 are detachably connected to their respective support frames by way of quick-release mechanisms 182 disposed on either side of the members. FIG. 2 specifically illustrates how the pressure member 160 may be detachably mounted in particular to the fuser mounting frame 170, since such mounting is a key step in the implementation of the method of the invention.

The fuser mounting frame 170 includes a pair of opposing side plates 172 (of which only one is shown) connected together by horizontal support members 174*a, b*, and *c*. The pressure roller 160 has a pair of opposing, disc-shaped side plates 178, each of which includes a stub shaft or gudgeon 180 extending from its center. The gudgeons 180 on either side of the pressure member 160 are rotatably mounted in the quick-release assemblies 182. As will be explained in more detail hereinafter, the quick-release assemblies 182 may be slid into and secured within a square shaped recess 209 present in each of the side plates 172 of the mounting frame 170.

Each quick-release assembly 182 includes a support frame 183 having plate-like inner and outer portions 184*a*, 184*b* which are spaced apart to define slots 185*a*, 185*b* on either side of the support frame 183. These slots 185*a*, 185*b* are dimensioned to slidably receive the side edges of the square shaped recess 209 of the fuser mounting frame 170. The support frame 183 also carries a roller bearing 186 into which the gudgeon 180 is journalled, and a drive gear 187 that is non-rotatably coupled to the gudgeon by a keyway formed by the engagement of a flat side 188 of the gudgeon against a flat side 189 in the central opening of the drive gear 187. A locking plate 190 slides into an annular groove 192 at the distal end of the gudgeon 180 to secure the quick-release assembly 182 to the gudgeon 180 in much the same fashion that a common cotter pin functions. A set screw 194 secures the locking plate 190 in place. The stem 196 of the quartz-halogen light extends from the distal end of the gudgeon 180 as shown, and is mounted on a support flange 197.

With specific reference to FIG. 3, the locking and unlocking components of each of the quick-release assemblies 182 include a handle 198 connected to a pair of spring-loaded locking pins 200*a*, 200*b*. Each of these locking pins 200*a*, 200*b* is disposed in a bore 201 in the outer portion 184*b* of the support frame 183 having an enlarged diameter portion 203. Each of these locking pins 200*a*, 200*b* includes an annular flange 205 that captures a compression spring 207 between itself and an opposing end of the enlarged diameter portion 203. In operation, the handle 198 is pulled out to the position indicated in phantom, which in turn withdraws the end of the pins 200*a*, 200*b* inside the bore 201. The pressure member 160 is then moved upwardly such that the edges of the side plate 172 on either side of recess 209 are slid into the slots 185*a*, 185*b* on either side of the quick-release frame 183. When the ends of the locking pins 200*a*, 200*b* are in alignment with pin receiving holes 210*a*, 210*b*, the handle 198 is then released, which allows the biasing force of the spring 207 to insert the ends of the locking pins 200*a*, 200*b* into the holes 210*a*, 210*b* in the side plate 172.

Figure 4:
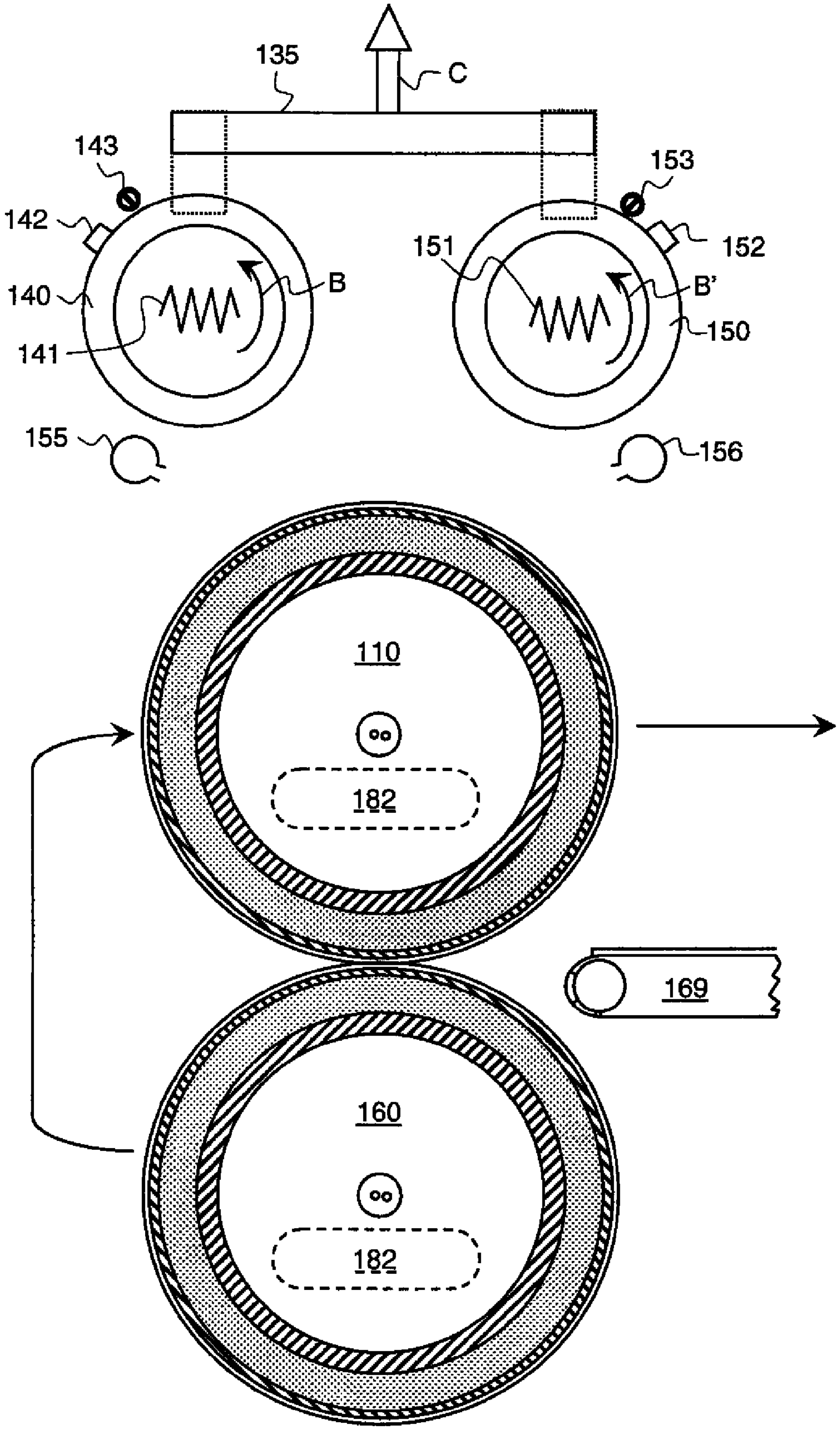
FIG. 4 is a side, cross-sectional schematic view of the electrophotographic printer of FIG. 1 illustrating how the first steps of the method of the invention are implemented by removing the fuser roller from the printer frame and mounting the pressure roller into the operational position of the fuser member.

FIG. 4 schematically illustrates the first steps of a preferred implementation of the method of the invention. In this preferred implementation, the heater roller assembly 135 is first moved out of pressurized engagement with the fuser roller 110. Next, the fuser member 110 is removed from the fuser frame 170 by pulling outwardly on the handles 198 of the quick-release assemblies 182 on either side of the fuser member 110. Such pulling withdraws the locking pins 200*a*, 200*b* from the pin receiving holes 210*a*, 210*b* in the side plates 172 of the fuser frame 170, allowing the quick-release assemblies 182 to be slid out of the recesses 209. Next, the pressure member 160 is released from its support frame (not shown) and is installed in the fuser frame 170 via the spring-loaded locking pins 200*a*, 200*b* of its quick-release assemblies 182 (as indicated by the curved arrow) in the same mariner as described with respect to the fuser member 110.

Figure 5:
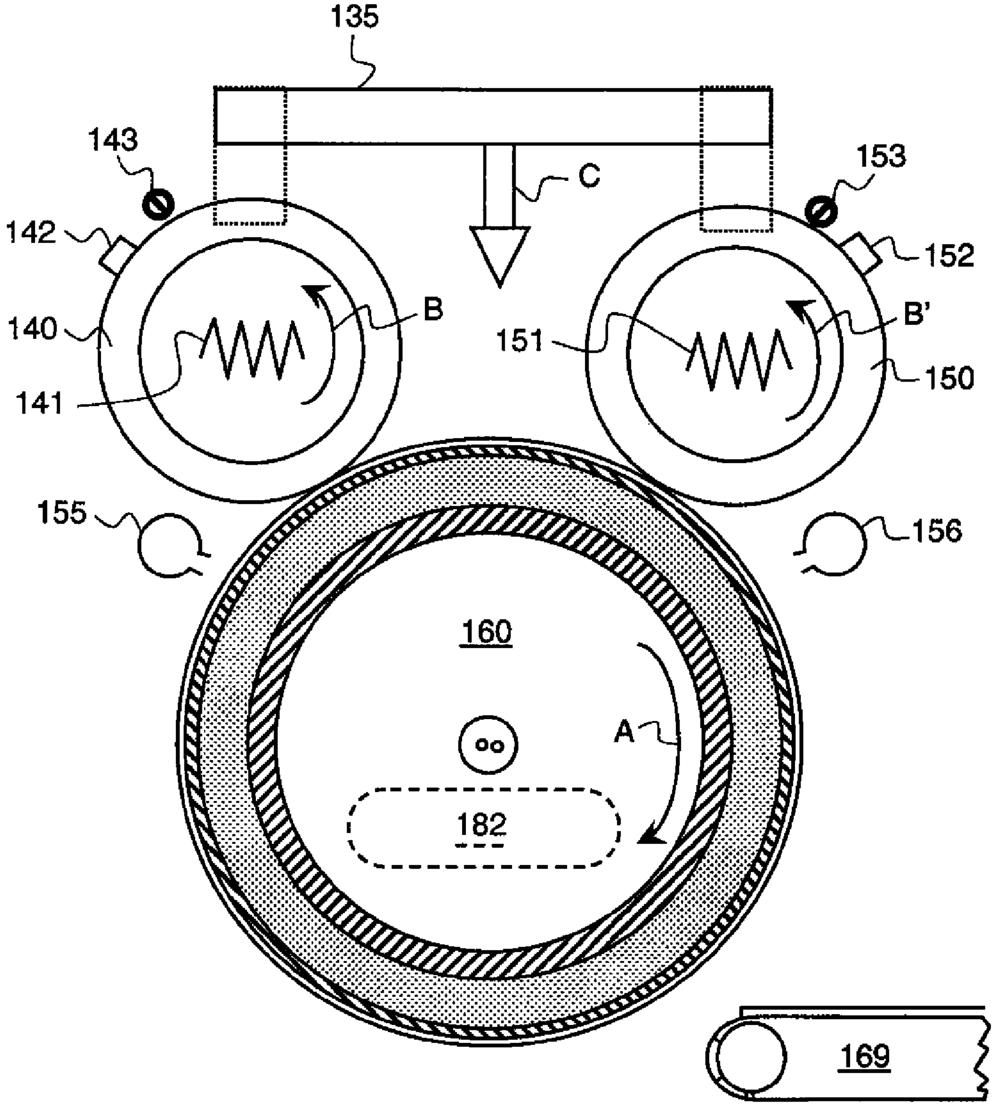
FIG. 5 is a side, cross-sectional schematic view of the electrophotographic printer of FIG. 1 illustrating how the last steps of the method of the invention are implemented by using the heater roller assembly to refurbish the outer surface of the pressure roller.

Once the pressure member 160 is mounted in the position indicated in FIG. 5, a set of specialized programmed schemes are executed to simultaneously heat and pressurize the thermoplastic topcoat 162 of the cylindrical member 160 to a temperature at least 10° C. below the onset of the melting temperature (Tm) of the outer surface topcoat material, for example, where the heater temperature is from 280 to 320° C. for PFA and PTFE materials, and at a pressure of at least 5 psi, i.e. to refurbish the topcoat material, by taking advantage of the heater rollers 140, 150 which are normally used for externally heating the fuser member 110 to fuse toner during the printing operation. This set of specialized programmed schemes will automatically control the flow of the following steps at a printing press by the main machine control. For example in one embodiment:

(1) Raise the temperature of the heater roller higher than that for normal printing operation such that the pressure roller surface temperature is brought to a temperature of between 10° C. below the melt temperature and the melt temperature of the topcoat materials;

(2) Set the fuser roller and the heating roller over-temperature sensors to a pre-determined distance suitable for refurbishing temperature range, other than the normal printing mode set-points;

(3) Rotate the fuser member at a rotational speed at least 1 rpm, engage the heater roller with a contact pressure of at least 5 psi, in this embodiment measured as an average pressure transversely across the nip, and up to a needed level a temperature of between 10° C. below the melt temperature (Tm) and the melt temperature of the topcoat materials but the temperature could also be the pressure measured at least at one point on the roller, the average circumventially or a minimum at one or more points so that the required temperature is reached at the portions necessary to effect the change required;

(4) Turn on the cooling air via air jets 155, 156 to cool the pressure member at a position away from the nip of the heater rollers 140, 150 to prevent overheating of the sublayers 163, 164 and to have fast recovery to the normal printing mode set-points;

(5) Engage the heater rollers 140, 150 on the pressure member surface with program-controlled functions of pressure and temperature for a period of time sufficient to refurbish the pressure member and at least one rotation, typically a range of 1 to 3 minutes in this embodiment. Note that this is the time necessary for a rotational speed of 1 rpm and normally the speed could be higher, especially during operation embodiments and then the time to achieve the changes are significantly less as is calculable based on the 1 rpm number and the diameter of the roller. The time been measured at 5 seconds in some circumstances.

(6) While rotating the cylindrical member engaged with the at least one heating member, various processing adjustment parameters are accessed and one or more of the pressure, time, or temperature are adjusted to compensate for these parameters and controlling the engaging and rotating steps accordingly for a time sufficient to resurface of the outer surface of the cylindrical member as is appropriate for the situation. Note that these processing parameters can be stored in a table, calculated or transmitted from another source.

The processing adjustment parameters could include one or more of a cylindrical material, diameter, shape and profile where the material includes material properties such as yield strength, melting temperature etc.

The present invention preferably is initiated after the pressure member has serviced a same print job for a period of time such that artifact may show up in a subsequent different print job, depending on the printing service requirement. Artifacts that require pressure member refurbishing include paper edge wear marks, foreign materials or paper dust from paper in the area of no toner stripes and/or scratch lines due to the fabric cleaning pad applied directly to the pressure roller surface or any other mishap. The initiation of the pressure member refurbishing program can also be a part of the scheduled maintenance.

Before activating the above refurbishing scheme, it is necessary to assure clean surfaces of the pressure member 160 and heater rollers 140, 150, i.e. the pressure member surface 162 should be free of contamination, such as, residual toner or deposit of foreign materials, such as from paper. A method to clean the surfaces of the pressure member 160 as well as the heater rollers 140, 150 to precede the method of the present invention is done by non-invasive methods such as by applying soft rags with solvents.

EXAMPLE

An example is given on a pressure member made of 25-micron-thick PFA (of a melting temperature 305° C.) topcoat, under which is 35-micron-thick Viton, under which is 200-mil-thick silicone rubber. The pressure member serviced for 50,000 A4-equivalent prints of Tabloid sized paper of 300-micron thick on a Nexpress 2100 printing press with external heated fuser assembly and showed de-glossing along the in-track paper edge on the topcoat. The subsequent print on a wider coated paper showed a gloss drop in G60 value by 20 points along the de-glossed edge of the pressure member. The pressure member refurbishing program was activated. After exchanging positions with the fuser member, the pressure member was refurbished at temperature around 300 to 305° C. of the external heater rollers with a programmed pressure that started from 5 psi and increased to 30 psi for about 2 minutes in line to the extent that the paper edge de-glossing was not visible on the pressure member and the subsequent print on a wider coated paper showed non-measurable difference in G60 value on the print that contacted the Tabloid-sized paper edge area of the pressure member.

The invention has been described in detail with particular reference to certain preferred embodiments thereof, but it will be understood that variations and modifications can be effected within the spirit and scope of the invention.

What is claimed is:

1. A method of resurfacing a cylindrical member comprising:

providing a cylindrical member comprising an outer surface comprising a low surface energy, semicrystalline thermoplastic wherein the low surface energy, semicrystalline thermoplastic is a fluorothermoplastic comprising a fluoropolymer resin selected from the group consisting of polytetrafluoroethylene, polyperfluoroalkoxy-tetrafluoroethylene, polyfluorinated ethylene-propylene, polyvinylfluoride, polyvinylidene fluoride, poly(ethylene-chloro-trifluoroethylene), polychlorotrifluoroethylene and blends thereof;

engaging the outer surface of the cylindrical member with at least one heating roller at an initial pressure of at least 5 psi and at an initial temperature of between 10° C. below the melt temperature and the melt temperature of the thermoplastic using an internal heater;

rotating the cylindrical member while engaged with the at least one heating roller for a time sufficient to resurface of the outer surface of the cylindrical member;

accessing processing adjustment parameters;

adjusting one or more of a pressure, temperature and time of heating; and controlling the engaging and rotating steps accordingly.

2. The method of claim 1 wherein the processing adjustment parameters include one or more of a cylindrical material, diameter, shape and profile.

3. The method of claim 1 the outer surface of the cylindrical member is cleaned prior to engaging the outer surface of a fuser member with the heating roller.

4. The method of claim 1 wherein the cylindrical member is located in a printer having a heater roller for externally heating a fuser member, and including the steps of removing the fuser member and mounting the cylindrical member in the place of the fuser member.

5. The method of claim 4 wherein the step of engaging the outer surface of the cylindrical member with at least one heating roller at a pressure of at least 5 psi at a temperature of at least 10° C. below the melt temperature of the fluorothermoplastics implemented by the heater roller for externally heating the fuser roller.

6. The method of claim 4 wherein the fuser member and the cylindrical member are detachably mounted to a frame of the printer by quick-release mechanisms, and wherein the steps of removing the fuser member and mounting the cylindrical member in the place of the fuser member are implemented by the operation of said quick-release mechanisms.

7. The method of claim 4 wherein the fuser member and the cylindrical member are rollers having substantially the same diameter.

8. The method of claim 4 wherein the composition and thickness of the fluorothermoplastic comprising the outer surface of the fuser member and the cylindrical member is the same.

9. A method of resurfacing a cylindrical member having an outer surface comprising a fluorothermoplastic and located in a printer having a heater roller for externally heating a fuser member, comprising the steps of removing the fuser member and mounting the cylindrical member in the place of the fuser member;

engaging the outer surface of the cylindrical member with the heater roller at a pressure of at least 5 psi at a temperature of at least 10° C. below the melt temperature of the fluorothermoplastic;

rotating the cylindrical member while engaged with the heating roller for a time sufficient to resurface of the outer surface of the cylindrical member.

10. The method of claim 9 wherein the fuser member and the cylindrical member are detachably mounted to a frame of the printer by quick-release mechanisms, and wherein the steps of removing the fuser member and mounting the cylindrical member in the place of the fuser member are implemented by the operation of said quick-release mechanisms.

11. The method of claim 9 wherein the quick-release mechanism of the cylindrical member has spring-loaded locking pins, and the printer has a fuser frame with pin-receiving holes, and the cylindrical member is mounted in the place of the fuser member by inserting the locking pins into the pin-receiving holes.

12. The method of claim 9 wherein the fuser member and the cylindrical member are rollers having substantially the same diameter, and wherein the thicknesses of the outer surface of the fuser member and the outer surface of the cylindrical member comprising the fluorothermoplastic are the same.

13. The method of claim 9 wherein the cylindrical member is rotated at a speed of at least 1 rpm.

14. The method of claim 9 the outer surface of the cylindrical member is cleaned prior to engaging the outer surface of the fuser member with the heating roller.

15. A method of resurfacing a cylindrical member comprising:

providing a cylindrical member comprising an outer surface comprising a fluorothermoplastic having both a melting temperature $T_m$ wherein the fluorothermoplastic comprises a fluoropolymer resin selected from the group consisting of polytetrafluoroethylene, polyperfluoroalkoxy-tetrafluoroethylene, polyfluorinated ethylene-propylene, polyvinylfluoride, polyvinylidene fluoride, poly(ethylene-chloro-trifluoroethylene), polychlorotrifluoroethylene and blends thereof;

engaging the outer surface of the cylindrical member with at least one heating roller at an average pressure of at least 5 psi along the entire length of the heating roller pressure nip;

at a temperature of the heating roller between $T_m$-30° C. and $T_m$-10° C.;

rotating the cylindrical member while engaged with the at least one heating roller for a time sufficient to reduce the maximum depth of a scratch or dent in the outer surface of the cylindrical member by at least half.

16. The method of claim 15 is rotated at least 1 rpm.

17. The method of claim 15 wherein the cylindrical member is one of a pressure member or a fuser member.

18. The method of claim 15 wherein the cylindrical member is located in a printer having a heater roller for externally heating a fuser roller, and including the steps of removing the fuser member and mounting the cylindrical member in the place of the fuser member and engaging the cylindrical member.

19. The method of claim 18 wherein the step of engaging the cylindrical member comprises engaging an outer surface of the cylindrical member with at least one heating roller at a pressure of at least 5 psi at a temperature of at least 10° C. below the melt temperature of the fluorothermoplastics implemented by the heater roller for externally heating the fuser roller.

20. The method of claim 18 wherein the fuser member and the cylindrical member are detachably mounted to a frame of the printer by quick-release mechanisms, and wherein the steps of removing the fuser member and mounting the cylindrical member in the place of the fuser member are implemented by the operation of said quick-release mechanisms.

21. The method of claim 18 wherein the fuser member and the cylindrical member are rollers having substantially the same diameter.

22. The method of claim 18 wherein the thicknesses of the outer surface of the fuser member and the outer surface of the cylindrical member comprising the fluorothermoplastic are the same.

* * * * *